United States Patent Office 3,549,347
Patented Dec. 22, 1970

3,549,347
MIXED CATION AMMONIUM POTASSIUM POLY-
PHOSPHATES AND METHODS FOR PREPARING
THE SAME
John W. Lyons, St. Louis, and Howard L. Vandersall,
Ballwin, Mo., assignors to Monsanto Company, St.
Louis, Mo., a corporation of Delaware
No Drawing. Filed May 15, 1968, Ser. No. 729,386
Int. Cl. C05b 7/00
U.S. Cl. 71—34                                11 Claims

ABSTRACT OF THE DISCLOSURE

A substantially water-insoluble crystalline ammonium-potassium polyphosphate having the formula $$(NH_4)_x K_y P_n O_{3n+1}$$

wherein $n$ is an integer having an average value greater than 10 and $x+y$ is equal to $n+2$ and the ratio of $x$ to $y$ is from 1:100 to 100:1 and processes for preparing same are disclosed.

---

This invention relates to novel mixed cation ammonium-potassium polyphosphate compositions. More particularly, this invention relates to ammonium-potassium polyphosphates which are slowly soluble in water and processes for preparing the slowly soluble ammonium-potassium polyphosphates.

In some fertilizer uses it is preferred to have at least some of the chemical compounds containing the plant nutrients dissolve at a relatively slow rate so that the plant receives the nutrients over a longer portion of the growing season. It is also preferred for fertilizers to contain nitrogen, potassium and phosphorus. It is believed that heretofore there has been no chemical compound which contains all three of these nutrients and which slowly releases the nutrients and which is in use as a fertilizer. Therefore, these three essential nutrients were not released at the same time or else released almost immediately when water is present in the soil. For example, a typical fertilizer heretofore produced is a blend of a nitrogen compound such as urea, a nitrogen phosphorus compound such as ammonium phosphates and a potassium compound such as potassium carbonate (potash). Since these compounds are highly water-soluble, they tend to dissolve rapidly and thus several applications are required to provide nutrients to the plants over the total growing season. Therefore, there is a need for a fertilizer containing at least a portion of the total desired amount of the major plant nutrients in a slowly soluble form, thus providing nutrients to the plant at the same rate and over a longer portion of the growth period. The present invention provides a chemical composition which contains the mixed cation ammonium-potassium polyphosphates having the solubility characteristics and other physical characteristics which are desirable in slow release type fertilizers.

In accordance with this invention, the novel compositions are prepared by thermal reactions between an ammoniating-condensing agent, a potassium-containing material and a phosphorus-containing material, all of which are described in detail hereinafter. The mixed cation ammonium-potassium polyphosphates of this invention are represented by the formula $(NH_4)_x K_y P_n O_{3n+1}$ wherein $n$ is an integer having an average value above about 20 and wherein $x+y$ is equal to $n+2$ and the ratio of $x$ to $y$ is from 1:100 to 100:1 and preferably the ratio of $x$ to $y$ being from 1:10 to 10:1. The average value of $n$ being greater than 20 is evidenced by the paper chromatography method [Karl-Kroupa, Anal. Chem., 28, 1091 (1956)] and the polymeric P-O-P type linkage is evidenced by N.M.R. spectra which indicates substantially no P-N-P type linkages and no ortho, pyro or short chain P-O-P type groups and by infra-red spectra which indicates P-O-P type linkages but does not indicate substantially any P-N type linkages. It should be noted that substantially all of the nitrogen in these polyphosphates is present as the ammoniacal nitrogen and there is substantially no nuclear nitrogen present in the polyphosphates.

The ammoniacal nitrogen and potassium to phosphorus ratio for the polyphosphates of the instant invention is about 1 when the chain length is relatively long, that is, when $n$ is relatively large, e.g. greater than about 100. Since $x$ and $y$ are equal to $n+2$, the ratio of nitrogen and potassium to phosphorus approaches unity. These polymeric mixed cation ammonium-potassium polyphosphates can be either straight chain structures or branched chain structures but are not cyclic in nature. The ammonium-potassium polyphosphates which have been found to possess these unique characteristics are those having an ammonium to potassium molar ratio of from about 1:100 to about 100:1. In addition, when the polyphosphates of the instant invention are characterized herein as being slowly soluble, it is intended to mean that the solubility of a slurry of 10 grams of solids/100 cc. of water at 25° C. for 60 minutes is about 5 grams/100 cc. of water or less. Specifically, for purposes of the present invention an ammonium-potassium polyphosphate having a solubility of a specified value refers to the solubility value in grams per 100 cc. of water when 10 grams of the mixed cation polyphosphate are slurried in 100 cc. of water at 25° C. for 60 minutes. Additionally, the polyphosphates of the instant invention have above about 90% of the $P_2O_5$ content available to the plant as measured by the citrate solubility test adopted by A.O.A.C.

The degree of polymerization of the slowly water-soluble ammonium-potassium polyphosphates is difficult to determine since known methods for determining such are "so-called" solution methods, that is, they employ solution techniques for polymerization measurements. For example, as determined by the end group titration method [Van Wazer, Griffith and McCullough, Anal. Chem., 26, 1755 (1954)] after converting the ammonium-potassium polyphosphate to the acid form by ion exchange resins [Van Wazer and Holst, J. Am. Chem. Soc., 72, 639 (1950)], the average numerical value of $n$ is from about 20 to about 400, preferably from about 40 to about 400; whereas, as determined by the method of light scattering or viscosity correlations obtained from light scattering [Strauss and Wineman, J. Am. Chem. Soc., 80, 2366 (1958)] modified by use of the Zimm plot method [Stacey, "Light-Scattering in Phyical Chemistry," Butterworths, London (1956)] the weight average value of $n$ is above about 500 and preferably from about 500 to about 100,000 with from about 1,000 to about 30,000 being especially preferred.

The mixed cation polyphosphates of the instant invention can be prepared by, in general, carrying out the thermal condensation method for producing ammonium polyphosphate in the presence of a potassium source. That is, the processes as disclosed in co-pending patent applications Ser. No. 514,657, filed Dec. 17, 1965, now abandoned and Ser. No. 420,459, filed Dec. 22, 1964 now U.S. Pat. 3,397,035, can be used with the exception that in addition to the reactants disclosed therein, the thermal condensation is conducted in the presence of a potassium-containing material. Suitable potassium-containing materials in general are the water-soluble potassium salts of inorganic acids, lower organic aliphatic acids and potassium hydroxide. Typical potassium salts of inorganic acids include potassium chloride, potassium carbonate, potassium acid phosphates and the like. Potassium salts of the beforementioned organic acids include potassium acetate, potassium formate and the like. Potassium hydroxide can also be used as a relatively inexpensive source of the potassium ion. Preferred potassium-containing materials are potassium hydroxide and potassium salts selected from the group consisting of potassium carbonate, potassium phosphates and mixtures thereof.

It is to be noted that when the potassium-containing material is a potassium phosphate, it is preferred to use a potassium acid phosphate to enhance the polymerization. A compound such as tripotassium orthophosphate can be used with the addition of about ⅓ of a molar equivalent amount of an acid such as condensed phosphoric acid to acidify the salt enough to enhance polymerization. Of the potassium phosphate salts, monopotassium orthophosphate is preferred as the potassium-containing material.

Ortho or condensed phosphoric acid can be used as a phosphate source. Condensed $H_2PO_4$ is a phosphoric acid containing any quantity of one or more polyphosphoric acids and/or metaphosphoric acids and any such acid can be employed in this invention. The polyphosphoric acids include pyrophosphoric acid and other polymers from the tri- to the nonapolymer and higher. The properties and compositions of the condensed phosphoric acids vary with the $P_2O_5$ content of the condensed phosphoric acid as discussed in Van Wazer, Phosphorus and its Compounds, Interscience Publishers, Inc., New York, N.Y., vol. 1 (1958), and shown by table 12–1, page 748. Although, in general for the instant invention any condensed phosphoric acid is suitable as the acid source, the preferred condensed phosphoric acids are liquid mixtures ranging from about 72 percent $P_2O_5$ by weight which contains about 89.4 percent orthophosphoric acid and 10.6 percent pyrophosphoric acid to about 85 percent $P_2O_5$ by weight which contains about 1.3 percent orthophosphoric acid, 1.8 percent pyrophosphoric acid, 2.4 percent tripolyphosphoric acid, and about 94 percent of polyphosphoric acid polymers higher than tripolyphosphoric acid. At least some of the phosphorus requirement can be derived from the ammonium and potassium ortho, pyro and condensed phosphate salts.

Typical of the ammoniating and condensing agents which are suitable for use in the instant invention are those nitrogeneous compounds which are capable of releasing ammoniacal nitrogen and condensing the phosphorus-containing reactant or reactants at temperatures up to about 260° C. In particular are the compounds containing one or more amide groups, i.e., a compound resulting from replacement of one or more atoms of hydrogen in ammonia by univalent acid radicals, and particularly the primary amides, and containing the elements carbon and/or sulfur, nitrogen, oxygen and hydrogen as well as containing no carbon-carbon bonds. Preferably the compounds are non-cyclic structures and there are few, if any, compounds which contain three or more amide groups which can be used in practicing the present invention. Especially preferred are low molecular weight nitrogeneous compounds, i.e., having a molecular weight below about 200, and containing at least one but no more than two of the following radicals: carbamyl, carbamic, sulfamino, sulfamyl and ureido. As being illustrative of such compounds are urea, ammonium carbamate, biuret, sulfamide, sulfamic acid, ammonium sulfamate, guanyl urea, methyl urea, amino urea, 1-3-di-amino urea, biurea and the like with urea, because of its relative inexpensiveness and ready availability, being particularly preferrred.

One method for preparing polyphosphates of the instant invention entails admixing condensed phosphoric acid, combined ammoniating and condensing agent and a potassium source and heat treating the mixture in a relatively anhydrous atmosphere. The amounts and ratios of the combined ammoniating and condensing agent, condensed phosphoric acid and potassium source will vary depending upon the ratio of ammonium to phosphorus to potassium desired in the final product. Since the ammonium-potassium polyphosphates can have an ammonium to potassium ratio of at most 100:1 and $x+y=n+2$, large excess amounts of nitrogen, that is, a N:P molar ratio of greater than 10 tend to produce by-products formed from the combined ammoniating and condensing agents, such as, cyanuric acid and the like when using urea as the ammoniating and condensing agent. In most cases, the reaction appears to be exothermic at about 120° C. to about 150° C., although if the heat is applied continuously for long periods of time, i.e., about 5 to about 300 hours, the reaction can be made to proceed using temperatures as low as 110° C. The times and temperature of heat treating required will depend upon, inter alia, the degree of polymerization desired as well as upon the proportions and physical states, i.e., degree of subdivision, uniformity of mixing, etc., of the reactants. In general, the times necessary to produce the desired product are dependent on the temperatures used with higher temperatures requiring shorter periods of time for heat treating.

Another method for preparing the polyphosphates of the instant invention entails reacting orthophosphoric acid and a combined ammoniating and condensing agent and heat treating the reaction product in the presence of a combined ammoniating and condensing agent and a potassium source hereinbefore described. Usually, any concentration of orthophosphoric acid can, in general, be used although it is preferred that concentrations above about 40% by weight be used and particularly preferred are concentrations of 85% and higher. In general, it is usually only necessary to add the combined ammoniating and condensing agent to the orthophosphoric acid and the potassium source, preferably admixing the reactants, and heating the admixture for the reaction to take place. As was applicable when using the condensed phosphoric acid as a reactant as hereinabove described, amounts of reactants can vary depending upon the desired nitrogen to potassium to phosphorus molar ratio desired. Since orthophosphoric acid can contain water and since water in the product has deleterious effects on the product obtained from heat treating as hereinabove described, it may be necessary in some cases to prevent or minimize the possibility of water in the reaction product by using excess amounts of the combined ammoniating and condensing agent in order to remove the water by hydrolysis and conduct the thermal reaction in an ammonia atmosphere. In most cases, the reaction will occur between about 110° C. to about 140° C. with the temperature being maintained for a sufficient time to produce the reaction product. Usually the reaction is initiated as soon as these temperatures are reached although in some cases it may be necessary to maintain the temperature for one hour or even longer, that is, up to about 300 hours. Depending upon the nitrogen to potassium to phosphorus molar ratio of reactants used, the reaction product will vary. Final temperature of between about 170° C. and about 260° C. for periods of time between about one hour and 24 hours used in 30 plant hours are preferred to obtain substantial conversion, with temperatures of between about 180° C. to about 220° C. for about five to 24 hours being particularly preferred, to produce the slowly soluble ammonium-potassium polyphosphate compounds of the instant invention. Relatively low temperatures are insufficient to form the compounds of the instant invention (less than about 110° C.), while temperatures in excess of about 260° C. tend to degrade or decompose the product, thereby preventing formation of compounds with the desired chain lengths and properties.

A further method for preparing the polyphosphates of the instant invention entails heat treating urea phosphate in the presence of the potassium phosphate, under conditions which are applicable to heat treating the reaction product of condensed phosphoric acid and the combined ammoniating and condensing agent as discussed hereinabove.

A still further method for preparing the polyphosphates of the instant invention entails reacting the ammonium and potassium phosphate salts, e.g., monammonium, diammonium, triammonium orthophosphate, with the potassium acid phosphates such as monopotassium orthophosphate, potassium acid, pyrophosphate and the potassium acid polyphosphates and the like, and mixtures thereof with the combined ammoniating and condensing agent. Since ammonium is a volatile cation completely neutralized ammonium salts can be used and polymerization will occur while with the potassium salts the salts must be acid salts to enable some thermal condensation to occur. As previously mentioned, however, acids can be added to partially acidify the salts. In general, it is usually only necessary to admix the ammonium and potassium phosphates and the combined ammoniating and condensing agent and heat treat the admixture in order to produce the compounds of the instant invention. Usually amounts of the combined ammoniating and condensing agent and ammonium and potassium phosphates between about 1 to about 10 on a nitrogen and potassium to phosphorus molar ratio basis of reactants are suitable, with a molar ratio of between about 1 and about 5 being particularly preferred. In general, the reactants need only be heated to temperatures sufficient to form a melt and then heat treating the melt for a time sufficient to produce the compounds of the instant invention. In most cases, temperatures as low as 170° C. for about 1 hour and as high as 250° C. for about 6 hours are suitable with temperatures of about 210° C. for about 24 hours being particularly preferred.

The molar ratio of potassium to ammonia in the reactants should be in the ratio of about 1:100 to about 100:1 depending upon the ratio of ammonia to potassium that is desired in the final product. Choice of the particular ratio in the final product will be dependent to a large degree upon the end use application. For example, the ammonium to potassium ratio desired for a fertilizer will vary according to the soil upon which it is used, and upon the particular plants that are to be fertilized.

The new compositions have a varying X-ray diffraction pattern depending upon the ammonium to potassium ratio. For example, the X-ray diffraction pattern for the composition having a $NH_4:K$ ratio of 1:10 exhibits a shift from the major lines for potassium polyphosphates. As the ratio of $NH_4:K$ is increased, the X-ray diffraction pattern shifts increase and at ratios of $NH_4:K$ of about 1:1 the pattern is found to be quite different than the pattern for potassium polyphosphate. As the $NH_4:K$ ratio approaches 10:1 the X-ray diffraction is similar to that for ammonium polyphosphates, however, a shift in the major X-ray lines occurs. Throughout the range of $NH_4:K$ ratios, the X-ray diffraction pattern is found to be different from either ammonium polyphosphate or potassium polyphosphate. Furthermore, it is different than a physical blend of ammonium and potassium polyphosphates, the blend having the same $NH_4:K$ ratio. The following table illustrates the different X-ray diffraction patterns.

TABLE I.—X-RAY DIFFRACTION* LINES IN ORDER OF DECREASING INTENSITY

| Ammonium polyphosphate | | | Mixed cation ammonium potassium polyphosphate ($NH_4:K=65:35$) | | | Physical mixture of ammonium polyphosphate and potassium polyphosphate ($NH_4:K=65:35$) | | | Potassium polyphosphate | | |
|---|---|---|---|---|---|---|---|---|---|---|---|
| 2θ | d | $I/I_0$ | 2θ | d | $I/I_0$ | 2θ | d | $I/I_0$ | 2θ | d | $I/I_0$ |
| 14.69 | 6.02 | 100 | 14.9 | 5.94 | 100 | 14.70 | 6.02 | 100 | 26.21 | 3.40 | 100 |
| 16.33 | 5.42 | 48 | 25.70 | 3.46 | 70 | 26.25 | 3.30 | 54 | 25.90 | 3.44 | 87 |
| 23.32 | 3.81 | 33 | 16.57 | 5.35 | 54 | 25.95 | 3.43 | 45 | 39.63 | 2.27 | 55 |
| 25.48 | 3.49 | 33 | 13.7 | 6.46 | 45 | 25.50 | 3.49 | 31.4 | 14.02 | 6.31 | 46 |
| 27.55 | 3.23 | 25 | 39.5 | 2.28 | 34 | 14.05 | 6.3 | 25 | 28.30 | 3.15 | 24 |
| 28.75 | 3.10 | 25 | 28.0 | 3.18 | 34 | 14.15 | 6.23 | 22 | 32.55 | 2.75 | 24 |
| 26.07 | 3.41 | 17 | 23.50 | 3.78 | 32 | | | | 17.30 | 5.12 | 24 |
| 39.37 | 2.29 | 13 | 25.30 | 3.52 | 28 | | | | 16.82 | 5.27 | 19 |
| 15.85 | 5.59 | 13 | 26.30 | 3.39 | 24 | | | | 33.32 | 2.69 | 17 |
| | | | 32.05 | 2.79 | 19 | | | | 23.6 | 3.77 | 17 |
| | | | 23.85 | 3.73 | 15 | | | | 26.75 | 3.33 | 13 |
| | | | 27.55 | 3.23 | 15 | | | | 26.90 | 3.31 | 13 |
| | | | 28.52 | 3.13 | 12 | | | | 28.9 | 3.09 | 13 |
| | | | 32.8 | 2.73 | 12 | | | | 31.45 | 2.84 | 12 |
| | | | 38.8 | 2.32 | 11 | | | | 19.48 | 4.55 | 12 |
| | | | 37.65 | 2.39 | 10 | | | | | | |

*CuK radiation.

Thus, a new family of compositions have been discovered which vary from either the ammonium polyphosphates or the potassium polyphosphates or mixtures of the foregoing.

The following examples are presented to illustrate the invention, with parts by weight being used in the examples unless otherwise indicated. All X-ray diffraction data is given by CuK radiation.

EXAMPLE 1

About 46 parts of monoammonium orthophosphate and about 54 parts of diammonium phosphate, about 27 parts of monopotassium orthophosphate and about 68 parts of urea are mixed together and heated in a static bed for about 22 hours at about 275° C. Ammonia is released indicating that polymerization of the phosphates occurs. A sample of the product analyzed for nitrogen, $K_2O$ and $P_2O_5$ compared with theoretical for the compounds having an empirical formula, $(NH_4)_xK_yP_nO_{3n+1}$ is given below, wherein $x+y=n+2$ and the molar ratio of $x:y$ is 4:1.

TABLE II

| | Analysis | Theoretical |
|---|---|---|
| Percent: | | |
| N | 11.2 | 11.0 |
| $K_2O$ | 8.3 | 9.3 |
| $P_2O_5$ | 69.5 | 70.1 |

The percent ammoniacal nitrogen is 10.8% compared with the theoretical 11%. The percent of total $P_2O_5$ which is available as a nutrient to the plant is measured at essentially 100% by the A.O.A.C. standard method for determining available $P_2O_5$ which uses the citrate solubility method. The following X-ray diffraction pattern is obtained.

TABLE III

| 2θ | d | I/I₀ |
|---|---|---|
| 13.5 | 6.55 | 45 |
| 14.75 | 6.00 | 100 |
| 15.9 | 5.57 | 81 |
| 16.5 | 5.37 | 81 |
| 23.40 | 3.80 | 29 |
| 25.60 | 3.48 | 67 |
| 27.62 | 3.23 | 34 |
| 39.45 | 2.28 | 18 |

The foregoing composition is 11-70-8 slow release fertilizer composition having a solubility of 1.73 gm./100 cc. and is suitable for mixing with other fertilizers to yield a fertilizer having a relatively high slow release nitrogen source.

EXAMPLE 2

Essentially the same procedure as used in Example 1 is followed only about 37 parts of monoammonium orthophosphate and about 44 parts of diammonium phosphate, about 47 parts of monopotassium orthophosphate and about 68 parts of urea are used. A sample of the product is analyzed for nitrogen, $K_2O$ and $P_2O_5$ and compared with theoretical for a composition having the empirical formula $(NH_4)_xK_yP_nO_{3n+1}$ wherein $x+y=n+2$ and the ratio of $x:y$ is 65:35.

TABLE IV

| | Analysis | Theoretical |
|---|---|---|
| Percent: | | |
| N | 8.8 | 8.7 |
| $K_2O$ | 14.4 | 15.8 |
| $P_2O_5$ | 67.7 | 68.0 |

The percent ammoniacal nitrogen is 8.7% compared with the theoretical 8.72%. A percent of total $P_2O_5$ which is available as nutrient to the plant is measured at essentially 100% by the A.O.A.C. standard method for determining available $P_2O_5$ which uses the citrate solubility method. The following X-ray diffraction pattern is obtained on a sample of the product.

TABLE V

| 2θ | d | I/I₀ |
|---|---|---|
| 13.05 | 6.78 | 10 |
| 13.7 | 6.46 | 45 |
| 14.9 | 5.94 | 100 |
| 16.57 | 5.35 | 54 |
| 23.50 | 3.78 | 32 |
| 23.85 | 3.73 | 15 |
| 25.30 | 3.52 | 28 |
| 25.70 | 3.46 | 70 |
| 26.30 | 3.39 | 24 |
| 27.55 | 3.23 | 15 |
| 28.0 | 3.18 | 34 |
| 28.52 | 3.13 | 12 |
| 32.05 | 2.79 | 19 |
| 32.8 | 2.73 | 12 |
| 37.65 | 2.39 | 10 |
| 38.8 | 2.32 | 11 |
| 39.5 | 2.28 | 34 |

The foregoing composition is a 9-68-16 fertilizer composition having a solubility of 3.1 gm./100 cc. in water which provides slow release of nitrogen, potassium and phosphorus.

EXAMPLE 3

Following the procedure used in Example 1 only using about 29 parts of monoammonium orthophosphate and about 34 parts of diammonium phosphate, about 68 parts of monopotassium orthophosphate and about 68 parts of urea, a solid product is produced. A sample of the product is analyzed for nitrogen, $K_2O$ and $P_2O_5$ and compared with theoretical for a composition having the empirical formula $(NH_4)_xK_yP_nO_{3n+1}$ wherein $x+y=n+2$ and the ratio of $x:y$ is 1:1.

TABLE VI

| | Analysis | Theoretical |
|---|---|---|
| Percent: | | |
| N | 6.7 | 6.5 |
| $K_2O$ | 20.6 | 21.9 |
| $P_2O_5$ | 65.4 | 66.0 |

The percent ammoniacal nitrogen is 6.4% compared with the theoretical 6.5%. A percent of total $P_2O_5$ which is available as a nutrient to the plant is measured at about 99.7% by the A.O.A.C. standard method for determining available $P_2O_5$ which uses the citrate solubility method. The following X-ray diffraction pattern is obtained on a sample of the product.

TABLE VII

| 2θ | d | I/I₀ |
|---|---|---|
| 13.77 | 6.43 | 100 |
| 15.0 | 5.30 | 19 |
| 16.5 | 5.37 | 48 |
| 16.94 | 5.23 | 51 |
| 19.15 | 4.63 | 13 |
| 23.12 | 3.84 | 17 |
| 23.95 | 3.71 | 26 |
| 25.37 | 3.51 | 44 |
| 25.67 | 3.47 | 64 |
| 25.87 | 3.44 | 91 |
| 25.94 | 3.43 | 94 |
| 26.27 | 3.39 | 23 |
| 27.75 | 3.21 | 25 |
| 28.26 | 3.16 | 20 |
| 28.62 | 3.12 | 19 |
| 32.2 | 2.78 | 21 |
| 32.55 | 2.75 | 13 |
| 33.0 | 2.71 | 13 |
| 34.15 | 2.62 | 17 |
| 39.0 | 2.31 | 19 |
| 39.55 | 2.28 | 44 |

The foregoing composition is a 7-66-22 fertilizer composition having a solubility of 3.0% suitable for mixing with other fertilizer materials such as urea to yield a fertilizer having different release rates of nutrients, particularly nitrogen.

EXAMPLE 4

Following the procedure of Example 1 only using about 20 parts of monoammonium orthophosphate and about 24 parts of diammonium phosphate, about 88 parts of monopotassium orthophosphate and about 68 parts of urea, a solid material is produced. A sample of the product is analyzed for nitrogen, $K_2O$ and $P_2O_5$ and compared in Table VIII with the theoretical N, $K_2O$ and $P_2O_5$ content of a composition having the empirical formula $(NH_4)_xK_yP_nO_{3n+1}$ wherein $x+y=n+2$ and the ratio of $x:y$ is 35:65.

TABLE VIII

| | Analysis | Theoretical |
|---|---|---|
| Percent: | | |
| N | 5.3 | 4.4 |
| $K_2O$ | 26.4 | 27.6 |
| $P_2O_5$ | 63.8 | 64.1 |

The percent ammoniacal nitrogen is 4.4% compared with the theoretical 4.42%. A percent of total $P_2O_5$ which is available to the plant is measured at 99.1% by the A.O.A.C. standard method for determining available $P_2O_5$ which uses the citrate solubility method. The following X-ray diffraction pattern is obtained upon a sample of the product.

TABLE IX

| 2θ | d | I/I₀ |
|---|---|---|
| 13.82 | 6.40 | 65 |
| 16.56 | 5.35 | 37 |
| 17.05 | 5.19 | 43 |
| 19.18 | 4.62 | 12 |
| 23.20 | 3.83 | 15 |
| 23.95 | 3.71 | 21 |
| 25.65 | 3.47 | 71 |
| 25.97 | 3.43 | 100 |
| 26.35 | 3.38 | 19 |
| 27.87 | 3.20 | 23 |
| 28.58 | 3.12 | 17 |
| 30.90 | 2.89 | 11 |
| 32.30 | 2.77 | 20 |
| 32.5 | 2.75 | 15 |
| 33.1 | 2.70 | 15 |
| 34.27 | 2.61 | 15 |
| 39.15 | 2.30 | 24 |
| 39.57 | 2.28 | 42 |

The foregoing composition is a 5-64-26 slow release fertilizer composition having a solubility of 1.1% and is suitable for providing a slow release of the nitrogen, potassium and phosphorus plant nutrients.

EXAMPLE 5

Following the procedure of Example 1 only using about 11.5 parts of monoammonium orthophosphate and about 13.6 parts of diammonium phosphate, about 108.8 parts of monopotassium orthophosphate and about 68 parts of urea, a solid product is produced which has a water solubility of 0.5% at 25° C. A sample of the product is analyzed for nitrogen, K₂O and P₂O₅ and is compared in Table IX with the theoretical N, K₂O and P₂O₅ content for a composition having an empirical formula $(NH_4)_xK_yP_nO_{3n+1}$ wherein $x+y=n+2$ and the ratio of $x:y$ is 1:4.

TABLE X

| | Analysis | Theoretical |
|---|---|---|
| Percent: | | |
| N | 2.8 | 2.5 |
| K₂O | 32.5 | 33.1 |
| P₂O₅ | 61.2 | 62.3 |

The percent ammoniacal nitrogen is measured as 2.45% compared with the theoretical 2.46% thus indicating all of the nitrogen is present as ammoniacal nitrogen. The percent of total P₂O₅ which is available to the plant is measured at 100% by the A.O.A.C. standard method for determining available P₂O₅ which uses the citrate solubility method. The following X-ray diffraction pattern is obtained upon a sample of the product.

TABLE XI

| 2θ | d | I/I₀ |
|---|---|---|
| 13.9 | 6.37 | 57 |
| 16.72 | 5.30 | 42 |
| 17.05 | 5.19 | 30 |
| 17.15 | 5.16 | 35 |
| 23.35 | 3.81 | 18 |
| 24.0 | 3.70 | 13 |
| 25.75 | 3.46 | 85 |
| 26.05 | 3.42 | 100 |
| 26.55 | 3.35 | 18 |
| 28.05 | 3.18 | 23 |
| 28.75 | 3.10 | 16 |
| 31.15 | 2.87 | 12 |
| 32.45 | 2.76 | 20 |
| 33.0 | 2.71 | 16 |
| 33.15 | 2.70 | 13 |
| 34.35 | 2.61 | 13 |
| 39.55 | 2.28 | 50 |

The foregoing composition is a 2-61-32 slow release fertilizer composition having a solubility of about 0.5% and is suitable for providing a relatively high slow release potassium source.

In the above examples monoammonium and diammonium orthophosphate and monopotassium orthophosphate were used as the ammonia, potassium and phosphorus sources. Equal good results are achieved when other phosphate-containing materials and potassium-containing materials are substituted in substantially molar equivalent amounts for the compounds used in the above examples.

What is claimed is:
1. A process for preparing substantially water-insoluble crystalline ammonium-potassium polyphosphates having the formula

$$(NH_4)_xK_yP_nO_{3n+1}$$

wherein $n$ is an integer having an average value greater than 10 and $x+y$ is equal to $n+2$ and $x:y$ is between about 0.1 and about 10, which comprises thermally condensing a phosphate source material, an ammoniating agent, a potassium-containing material and a condensing agent, said thermal condensation conducted at temperatures of from about 100° C. to about 250° C. for a sufficient time to produce said crystalline ammonium-potassium polyphosphate.

2. A process according to claim 1 wherein a combined ammoniating agent and condensing agent containing at least one amide group is used.

3. A process according to claim 2 wherein said phosphate source material is selected from the group consisting of ammonium phosphates, orthophosphoric acid, condensed phosphoric acid and mixtures thereof.

4. A process according to claim 3 wherein said potassium-containing material is selected from the group consisting of potassium acid phosphates, potassium chloride, potassium carbonate, potassium hydroxide and mixtures thereof.

5. A process according to claim 4 wherein said combined ammoniating and condensing agent is urea.

6. A process according to claim 5 wherein said phosphate-containing material is ammonium orthophosphate.

7. A process according to claim 5 wherein said phosphate-containing material is orthophosphoric acid.

8. A process according to claim 5 wherein said phosphate-containing material is condensed phosphoric acid.

9. A process according to claim 5 wherein said phosphate-containing material is monopotassium orthophosphate.

10. A substantially water-insoluble crystalline ammonium-potassium polyphosphate having the formula $$(NH_4)_xK_yP_nO_{3n+1}$$

wherein $n$ is an integer having an average value greater than 10 and $x+y$ is equal to $n+2$ and the ratio of $x$ to $y$ is from 1:100 to 100:1.

11. A substantially water-insoluble crystalline ammonium-potassium polyphosphate according to claim 10 wherein $n$ is from about 20 to about 400 as determined by the end group titration method and wherein the ratio of $x$ to $y$ is from 1:10 to 10:1.

References Cited

UNITED STATES PATENTS 3,397,035  8/1968  Shen et al. _____ 23—106

J. L. DE CESARE, Primary Examiner

U.S. Cl. X.R.

23—106; 71—46.51